C. J. BREY.
TOP JOINTER FOR BAND SAWS.
APPLICATION FILED OCT. 16, 1908.

932,752.

Patented Aug. 31, 1909.

WITNESSES:
John E. Heller,
Minnie C. Rollwage.

INVENTOR.
Charles J. Brey
BY
Abraham Knobel,
ATTORNEY.

UNITED STATES PATENT OFFICE.

CHARLES J. BREY, OF LOUISVILLE, KENTUCKY.

TOP-JOINTER FOR BAND-SAWS.

932,752.

Specification of Letters Patent. Patented Aug. 31, 1909.

Application filed October 16, 1908. Serial No. 458,092.

*To all whom it may concern:*

Be it known that I, CHARLES J. BREY, a citizen of the United States, residing at Louisville, in the county of Jefferson and State of Kentucky, have invented a new and useful Top-Jointer for Band-Saws, of which the following is a specification.

This invention relates to top jointers for band saws, and the object of my improvement is, to provide a top jointer which is simple in construction and efficient in operation. In sharpening a saw with a file or with an emery wheel, as is done with most of the automatic grinders, there is left on the top of the saw tooth a bur or wire-edge. To get rid of this bur or wire-edge and put a keen cutting edge on the saw teeth and to "joint" or get the tops of the saw teeth in perfect alinement, its is customary to go over them with an oilstone. This requires an expert hand, in as much as the edges of the teeth must be straight and the corners square and sharp. An inexperienced or careless hand will round off the corners of the teeth, and a band saw tooth, if even slightly rounded, will follow the patch of least resistance, cutting toward the sharp corner of the tooth, and make what is called "snaky lumber". An oilstone held in a clamp and free to move only in the direction of the length of the saw will soon become worn and grooved in such a way as to round the corners of the saw teeth, which will necessitate frequent truing up of the oilstone.
My improvement obviates the difficulties mentioned above, by holding the oilstone in perfect alinement with the tops of the saw teeth, with its surface perpendicular to the plane of the saw, moving the oilstone from side to side so as to constantly present a fresh surface to the saw teeth, thus wearing the oilstone evenly, providing that the oilstone can be easily and quickly applied and removed, and providing that with it an inexperienced man may do good work. These objects and advantages I attain by means of the mechanism illustrated in the accompanying drawings, in which—

Figure 1:
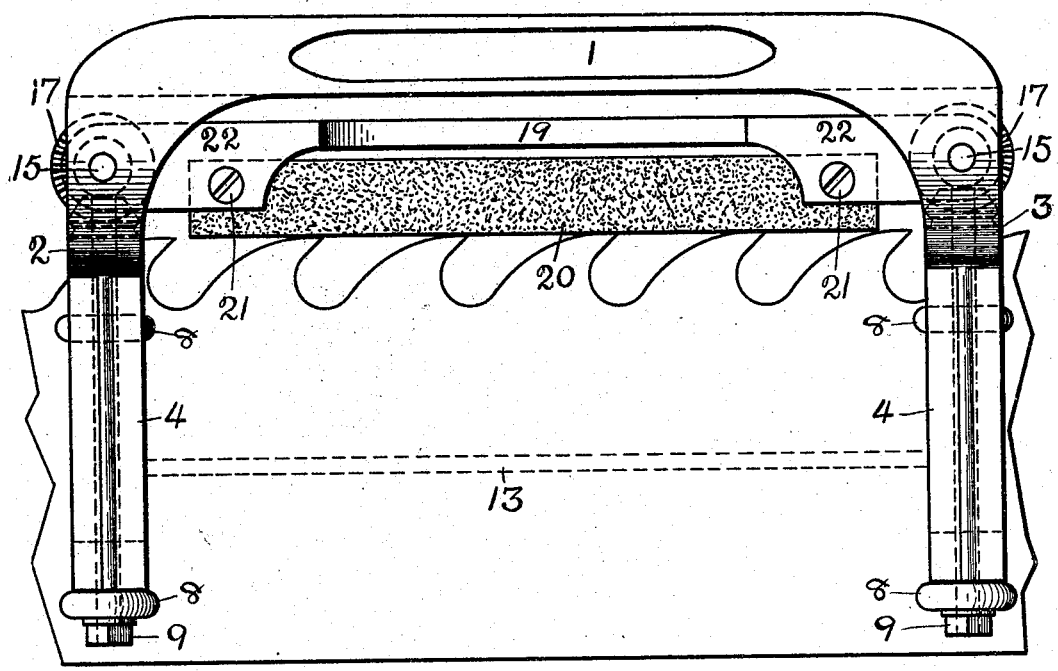
Figure 2:
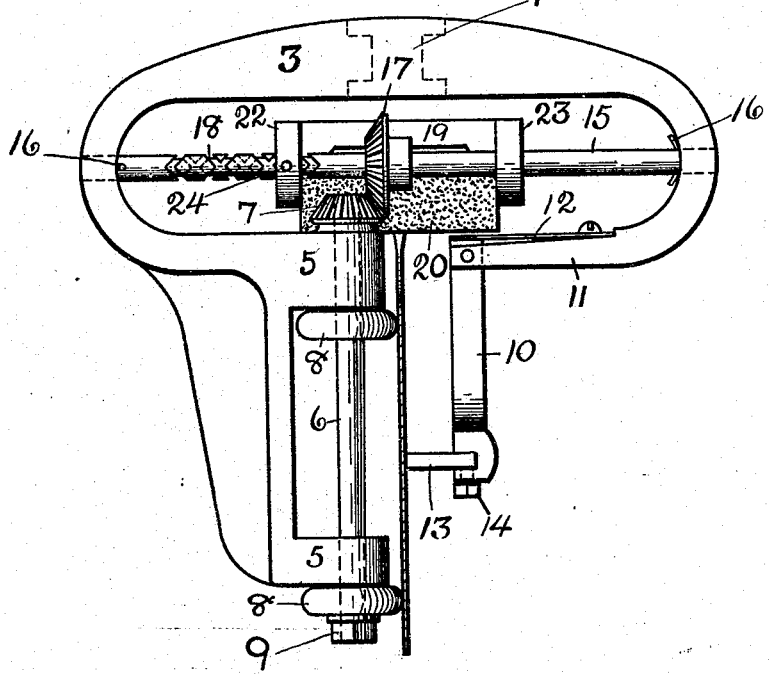

Figure 1 is a side elevation, and, Fig. 2 is an end elevation.

Similar reference numerals refer to similar parts throughout the views.

A longitudinal handle-bar, 1, provided with transverse substantially O shaped end members, 2 and 3, and hangers, 4, depending from end members 2 and 3, constitute the frame of my device. The hangers 4 are provided with journal bearings, 5, in which are journaled vertical shafts, 6. On the upper ends of the shafts 6 are mounted bevel pinions, 7. Just below each of the journal bearings 5 are secured friction driving-wheels, 8, adapted to bear against one side of the saw. On the lower end of each shaft 6 a nut, 9, is placed, to hold the lower friction wheel 8 in place.

Depending arms, 10, are pivotally mounted in the ends of limbs, 11, of each of the end members 2 and 3. Springs, 12, are fastened on the upper side of the limbs 11 the free ends of which bear upon the tops of arms 10 and hold them in vertical position. A longitudinal connecting-bar, 13, adapted to bear against the saw, is secured in a slot near the lower end of each arm 10, by means of set screws, 14. The length of the arms 10 is such that the bar 13 bears against the saw on the opposite side from, but midway between, the upper and lower friction wheels 8.

Transverse shafts, 15, are journaled in the O shaped end members 2 and 3, and are held in place by pins, 16, or similar means. Bevel gears, 17, are secured on the shafts 15, in position to engage bevel pinions 7, on the ends of shaft 6. A multiple return groove, 18, is provided on the shafts 15. A holder, 19, is provided for an oilstone or equivalent flat abrasive, 20, and slidably mounted on shafts 15. The oilstone may be held in the holder 19 by set-screws, 21, that extend through lugs, 22 and 23, and engage the oilstone. The lugs 22 and 23 project beyond the ends of the holder and are provided with perforations through which the shafts 15 pass. A pin, 24, extends through each of the lugs 22 and engages the return groove 18.

The operation of my device may now be understood. By moving bar 13 and arms 10 outward against the pressure of the springs 12, the jointer may be placed in position over the saw. The bar 13 is then released, when the pressure of springs 12, exerted through arms 10 and bar 13, on the saw will draw the friction wheels 8 firmly against the saw, on the opposite side from the bar 13. The device is then lowered until the oilstone rests on the teeth. The device is then pushed forward on the saw, the oilstone removing all bur or wire edge and jointing up the tops of the teeth. At the same time the friction wheels 8, bearing against the saw, rotate the shaft 6 and, through the bevel gears 7 and 17, rotate the transverse shaft 15, and, by means of the pins 24 engaging the groves 18, cause the holder 19 to move back and forth transversely relative to the plane of the saw, carrying with it the oilstone and thus constantly presenting a fresh surface to the saw teeth and distributing the wear evenly over the surface of the oilstone.

Having thus described my invention, so that anyone skilled in the art pertaining thereto may make and use it, I claim—

1. A top jointer for band saws, comprising a frame, an oilstone, means for holding said frame in operative position on a band saw, and means for automatically reciprocating said oilstone laterally, relative to the saw when said oilstone is moved along the saw.

2. A top jointer for band saws, comprising a frame, a holder mounted in said frame, an oilstone mounted in said holder, and means for automatically reciprocating said holder laterally relative to the saw when said frame is moved along the saw.

3. A top jointer for band saws, comprising a frame, transverse shafts journaled in said frame, a holder mounted on said shafts, an oilstone secured in said holder, and means for reciprocating said holder on said shafts.

4. A top jointer for band saws, comprising a frame, transverse shafts journaled in said frame, multiple return grooves on said shafts, a holder mounted on said shafts, means engaging said holder with said multiple return grooves, and means for rotating said shafts.

5. A device of the character described, comprising a frame, an oilstone-holder mounted in said frame and adapted to be reciprocated laterally therein, and means actuated by the longitudinal movement of a device along a saw to reciprocate said holder.

6. A device of the character described, comprising the combination of a frame, a laterally movable oilstone-holder mounted in said frame, a vertical shaft journaled in said frame, friction wheels on said vertical shaft, means for holding said friction wheels in contact with a saw, and means operated by said vertical shaft to reciprocate said holder laterally.

7. A top jointer for band saws, comprising a frame, an oilstone holder mounted in said frame, a vertical shaft, friction wheels on said shaft, and means operated by said vertical shaft for reciprocating said oilstone holder laterally.

CHARLES J. BREY.

Witnesses:
WM. J. SAUER,
W. B. MUNNELL.